(12) United States Patent
Klein

(10) Patent No.: US 7,796,773 B2
(45) Date of Patent: Sep. 14, 2010

(54) COMMUNICATION DEVICE COMPRISING SOUND-CONVEYING MEANS FOR TWO SOUND-PRODUCING MODES

(75) Inventor: Erich Klein, Himberg (AT)

(73) Assignee: NXP B.V., Eindhoven (NL)

( * ) Notice: Subject to any disclaimer, the term of this patent is extended or adjusted under 35 U.S.C. 154(b) by 527 days.

(21) Appl. No.: 10/564,542

(22) PCT Filed: Jul. 14, 2004

(86) PCT No.: PCT/IB2004/051215
§ 371 (c)(1),
(2), (4) Date: Jan. 12, 2006

(87) PCT Pub. No.: WO2005/006719
PCT Pub. Date: Jan. 20, 2005

(65) Prior Publication Data
US 2006/0171551 A1  Aug. 3, 2006

(30) Foreign Application Priority Data
Jul. 15, 2003  (EP) .................................. 03102153

(51) Int. Cl.
*H04R 1/20* (2006.01)

(52) U.S. Cl. ............. 381/351; 379/420.01; 379/420.02; 379/433.02; 381/386

(58) Field of Classification Search ......... 381/345–354, 381/160–161, 372, 335, 337–339, 386; 379/432, 379/433.02, 420.01–420.02; 455/569.1; 181/145
See application file for complete search history.

(56) References Cited

U.S. PATENT DOCUMENTS 5,729,605 A    3/1998   Bobisuthi et al.

(Continued)

FOREIGN PATENT DOCUMENTS

CN    1306731    8/2001

(Continued)

OTHER PUBLICATIONS

Davis, Don; Davis, Carolyn; "Sound System Engineering"; 1997; Elsevier; 2nd ed.; pp. 145-146.*

*Primary Examiner*—Curtis Kuntz
*Assistant Examiner*—Ryan Robinson

(57) ABSTRACT

In a communication device (1) that is designed to deliver sound, in an against-the-ear mode, into a space (22) bounded by the ear and, in an away-from-the-ear mode, into an acoustic free space, a loudspeaker (3) is provided for generating the sound and a holding device (2) is furthermore provided, which holding device (2) comprises a first holding-device region (16) via which, in the against-the-ear mode, the sound generated by the loudspeaker (3) can be delivered without hindrance by the ear and which holding device (2) comprises a second holding-device region (15A) that does not comprise the first holding-device region (16) and via which, in the against-the-ear mode, the sound generated by the loudspeaker (3) can be fed to the space (22) bounded by the ear and a first sound-conveying device is furthermore provided with whose aid the sound generated by the loudspeaker (3) can be conveyed, in the away-from-the-ear mode, through the first holding-device region (16) into the acoustic free space, and a second sound-conveying device is furthermore provided with whose aid the sound generated by the loudspeaker (3) can be conveyed, in the against-the-ear mode, through the second holding-device region (15) into the space (22) bounded by the ear.

20 Claims, 3 Drawing Sheets

U.S. PATENT DOCUMENTS

Figure 1:
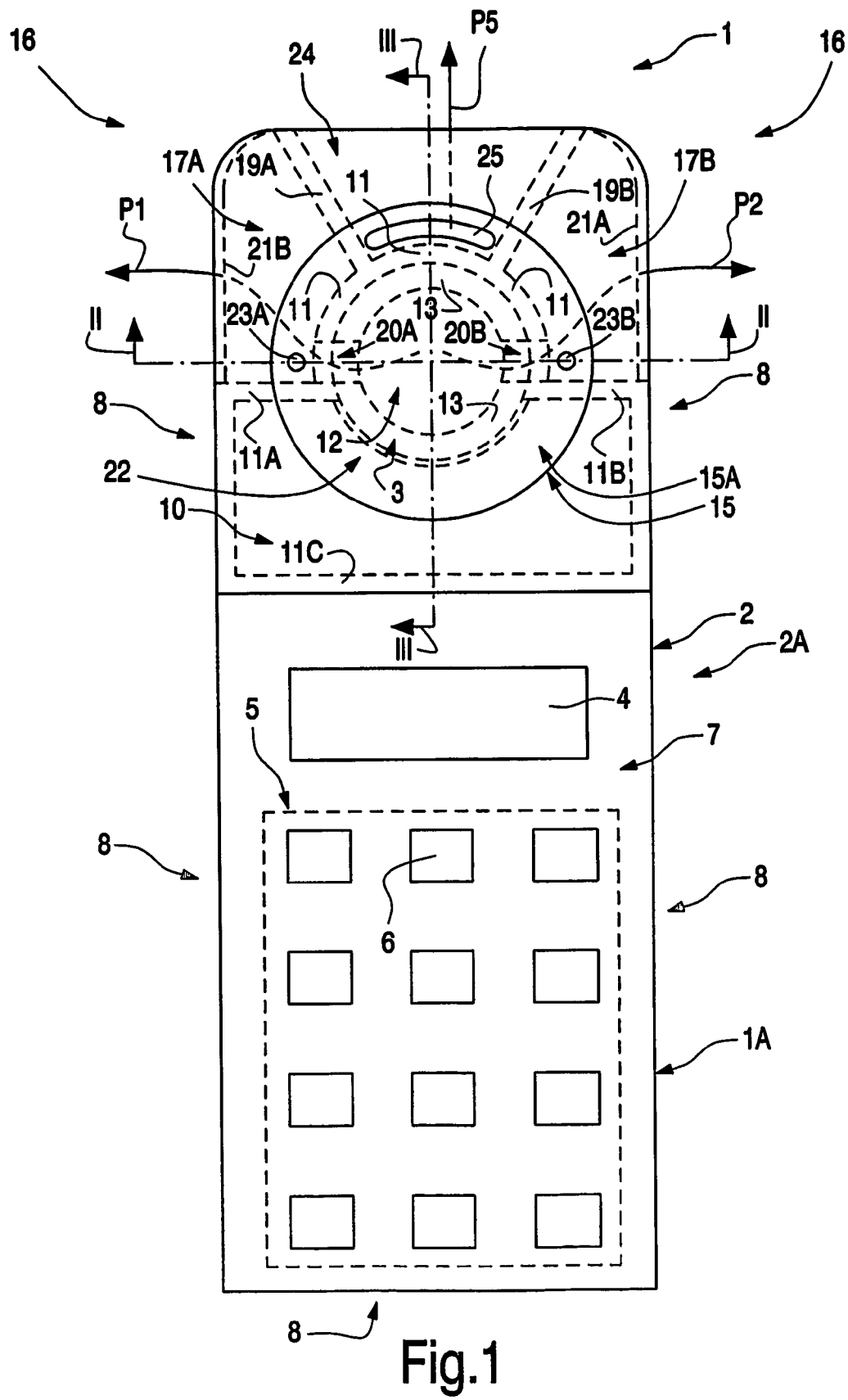

| | | | |
|---|---|---|---|
| 5,790,679 A * | 8/1998 | Hawker et al. | 381/163 |
| 6,002,949 A * | 12/1999 | Hawker et al. | 379/433.02 |
| 6,104,808 A * | 8/2000 | Alameh et al. | 379/433.02 |
| 6,134,336 A * | 10/2000 | Clark | 381/371 |
| 6,148,080 A * | 11/2000 | Collin | 379/433.02 |
| 6,160,897 A * | 12/2000 | Klein | 381/396 |
| 6,246,763 B1 * | 6/2001 | Dufosse | 379/433.13 |
| 6,411,719 B1 * | 6/2002 | Moster et al. | 381/345 |
| 6,490,361 B1 | 12/2002 | Klein | |
| 7,058,366 B2 * | 6/2006 | Patterson | 455/90.3 |
| 7,233,678 B2 * | 6/2007 | Erixon et al. | 381/345 |
| 2004/0071303 A1 * | 4/2004 | Furuya et al. | 381/182 |
| 2006/0120549 A1 * | 6/2006 | Burghardt | 381/351 |

FOREIGN PATENT DOCUMENTS

| | | |
|---|---|---|
| EP | 1091539 A2 | 4/2001 |

\* cited by examiner

COMMUNICATION DEVICE COMPRISING SOUND-CONVEYING MEANS FOR TWO SOUND-PRODUCING MODES The invention relates to a communication device that comprises a loudspeaker for generating sound and is designed to deliver the sound generated by the loudspeaker in an against-the-ear mode into a space bounded by an ear and in an away-from-the-ear mode into an acoustic free space.

The invention furthermore relates to a module for a communication device.

Such a communication device of the generic kind cited at the outset in the first paragraph is disclosed in U.S. Pat. No. 6,148,080.

In the case of the known communication device, which is implemented as a mobile telephone, there is provided inside a housing a single loudspeaker that forms a sound-conveying means and that is used both for an against-the-ear mode and for an away-from-the-ear mode, which is also described as the hands-free mode, for generating sound. The housing of the mobile telephone forms a holding means for holding the loudspeaker and comprises a first holding-means region or housing region via which the sound generated can be delivered without hindrance through a user's ear in the against-the-ear mode. Provided inside the first holding-means region are first sound-conveying means that are formed by a multiplicity of housing openings and with whose aid the sound can be conveyed or delivered, in the against-the-ear mode, by the loudspeaker into a space bounded by an ear and, in the away-from-the-ear mode, can be conveyed or delivered by the loudspeaker into the acoustic free space. The housing openings are disposed in such a way that they can never be covered simultaneously by a user's ear. The housing has, furthermore, a second housing region or a second holding-means region that also comprises the first holding-means region and has the area dimension of a standard measuring ear and is provided at the point in the housing at which the user's ear is normally brought into contact with the communication device in the at-the-ear mode. The second holding-means region is free of housing openings in order to avoid direct exposure of the ear to sound. Consequently, the sound generated with the aid of the loudspeaker can only penetrate indirectly into the space bounded by an ear, that is to say via the opening-free second housing region or via the acoustic free space.

In the case of the known communication device, there is the problem that, if correctly handled in the against-the-ear mode, there is an appreciable quality loss in the acoustic perception of the sound by the user because, in the against-the-ear mode, a sound pressure needed for an optimum perception of the sound or a sound-pressure frequency response needed is not achievable although, in the case of an incorrect operation of the mobile telephone, that is to say if the user inadvertently holds the mobile telephone against his ear despite the away-from-the-ear mode being activated, an overloading of the user's auditory organ due to a relatively high sound pressure occurring in the away-from-the-ear mode is reliably avoided.

It is an object of the invention to avoid the above-cited problem in a communication device of the generic kind cited at the outset in the first paragraph and to provide an improved communication device and a novel module for a communication device.

To achieve the above-cited object, features according to the invention are provided in a communication device in accordance with the invention such that a communication device in accordance with the invention can be characterized in the way specified below, namely:

A communication device that comprises a loudspeaker for generating sound and that is designed to deliver the sound generated by the loudspeaker, in an against-the-ear mode, into a space bounded by an ear and, in an away-from-the-ear mode, into an acoustic free space and that comprises holding means, which holding means comprise a first holding-means region via which, in the against-the-ear mode, the sound generated by the loudspeaker can be delivered without being blocked by the ear and which holding means comprise a second holding-means region that does not also comprise the first holding-means region and via which the sound generated by the loudspeaker can be fed in the against-the-ear mode to the space bounded by the ear, and that comprises first sound-conveying means by which the sound generated by the loudspeaker can be conveyed, in the away-from-the-ear mode through the first holding-means region into the acoustic free space, and that comprises second sound-conveying means by which the sound generated by the loudspeaker can be conveyed, in the against-the-ear mode, through the second holding-means region into the space bounded by the ear.

To achieve the above-cited object, in a module in accordance with the invention, features according to the invention are provided so that a module in accordance with the invention can be characterized in the way specified below, namely:

A module for a communication device as claimed in claim 12, wherein the module comprises the loudspeaker and the holding means for the loudspeaker and wherein the module comprises the first sound-conveying means and the second sound-conveying means.

The provision of the measures in accordance with the invention achieves the advantage, both in the case of an against-the-ear mode and in the case of an away-from-the-ear mode, that sound pressure needed for an optimum perceptibility of the sound or a sound-pressure frequency response needed can be achieved in a reliable way.

In the case of an achievement according to the invention, for example, provision can be made that the sound-collecting chamber is directly connected to the sound-delivery chamber. In the achievement according to the invention, however, it has been found particularly advantageous if, the measures as claimed in claim 2 are additionally provided. This achieves the advantage that a well-defined acoustic resistance exists between the sound-collecting chamber and the sound-delivery chamber.

In the achievement according to the invention, it has furthermore proved advantageous if the measures as claimed in claim 3 are provided. This achieves the advantage that the sound generated is deliberately conveyed into the sound-delivery chamber with a change in sound pressure and modification of the frequency response by the loudspeaker.

In the case of the achievement according to the invention, it has furthermore proved advantageous if the measures as claimed in claim 4 are provided. This achieves the advantage that the coupling line and the sound-delivery chamber matched in terms of dimensions to the coupling line form a resonator with whose aid the sound level is deliberately amplified in a certain frequency range and, to be precise, in the frequency range between 4 kHz and 10 kHz in the present case in order, for example, to increase the sound-pressure frequency response in the hands-free mode, to which a ringing or signaling mode or a music-reproduction mode is also assigned.

In the achievement according to the invention, it has furthermore proved advantageous if the measures as claimed in claim 5 are provided. This achieves the advantage that a protective action against unintentional contamination is achieved and that a resonant behavior, such as, for example, the fundamental resonance of the loudspeaker is attenuated so that deflection of the membrane of the loudspeaker is kept within permissible limits.

In the achievement according to the invention, for example, provision can be made that the passage opens directly into the sound-collecting chamber. In an achievement according to the invention, however, it has been found particularly advantageous if the measures as claimed in claim 6 are provided because it is thereby possible to couple out the sound from a region, in which region a reduced sound pressure is present compared with the sound pressure in the sound-collecting chamber.

In the achievement according to the invention, it has furthermore proved advantageous if the measures as claimed in claim 7 are provided. This achieves the advantage that the coupling of the sound out of the sound-delivery chamber into the passage has relatively little influence on sound delivery by the sound-delivery chamber into the acoustic free space in a hands-free mode, that is to say in the away-from-the-ear mode and a required good perceivability of the sound is nevertheless available in the against-the-ear mode.

In the achievement according to the invention, it has furthermore proved advantageous if the measures as claimed in claim 8 are provided. This achieves the advantage that, on the one hand, protection against unintentional contamination is achieved and that, on the other hand, the maximum volume at a user's ear can be limited.

In the achievement according to the invention, it has furthermore proved advantageous if the measures as claimed in claim 9 are provided. This achieves the advantage that the sound pressure is quite deliberately reduced in the space bounded by the ear. Furthermore, the advantage is achieved that the sound-pressure frequency response in the against-the-ear mode is relatively insensitive to various handling conditions, in which handling conditions, for example, the ear is completely pressed against the second holding-means region or the second holding-means region is not completely covered or does not cover the second holding-means region or is even a few millimeters to a few centimeters away from the second holding-means region.

In the achievement according to the invention, it has furthermore proved advantageous if the measures as claimed in claim 10 are provided. This achieves the advantage that the ear is ventilated by using a well-defined acoustic resistance.

In the achievement according to the invention, it has also furthermore proved advantageous if the measures as claimed in claim 11 are provided. This achieves the advantage that there is protection against an unintentional contamination and that, as a result of an attenuation of resonances, the sound level is reduced at low frequencies and adapted to a desired level.

In the achievement according to the invention, it has furthermore proved advantageous if the features as claimed in claim 12 are provided. This achieves the advantage that, for an optimum acoustic behavior, important regions around the loudspeaker can actually be manufactured to be acoustically sealed without having to take into account tolerances that an acoustically sealed system would not permit in the manufacture of a communication device.

It should also be mentioned that, in the case of a module as claimed in claim 13, the measures cited in connection with the communication device as claimed in any one of claims 2 to 11 are also provided and, accordingly, the advantages specified in the case of the communication device also come into effect in the case of such a module.

These and other aspects of the invention are apparent from and will be elucidated with reference to the embodiment described hereinafter.

The invention is described further below with reference to two exemplary embodiments shown in the drawings, to which the invention is not, however, restricted.

Figure 2:
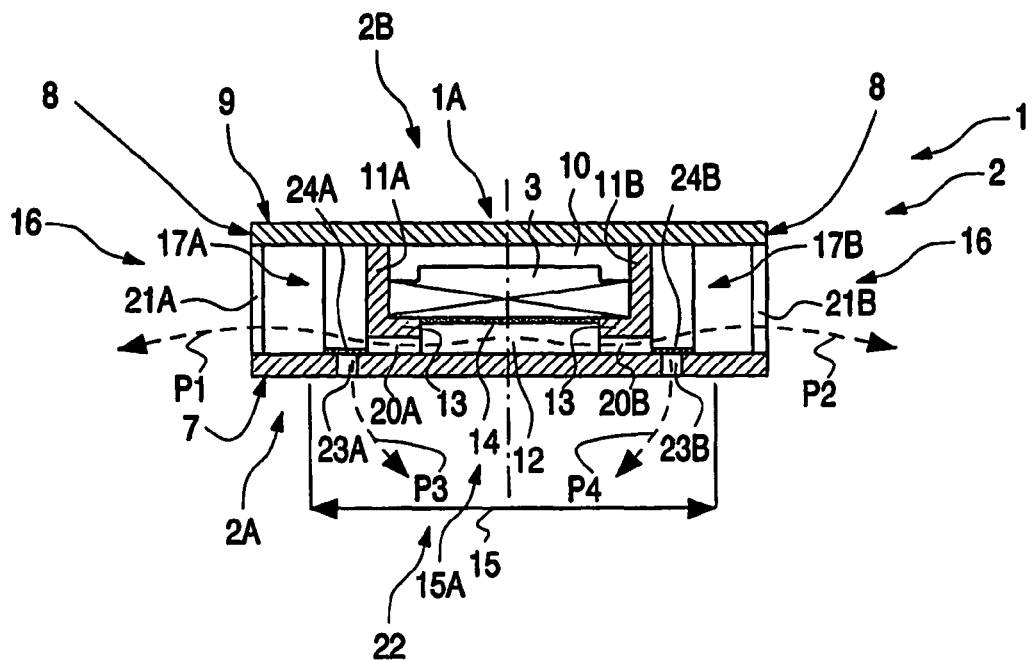
Figure 3:
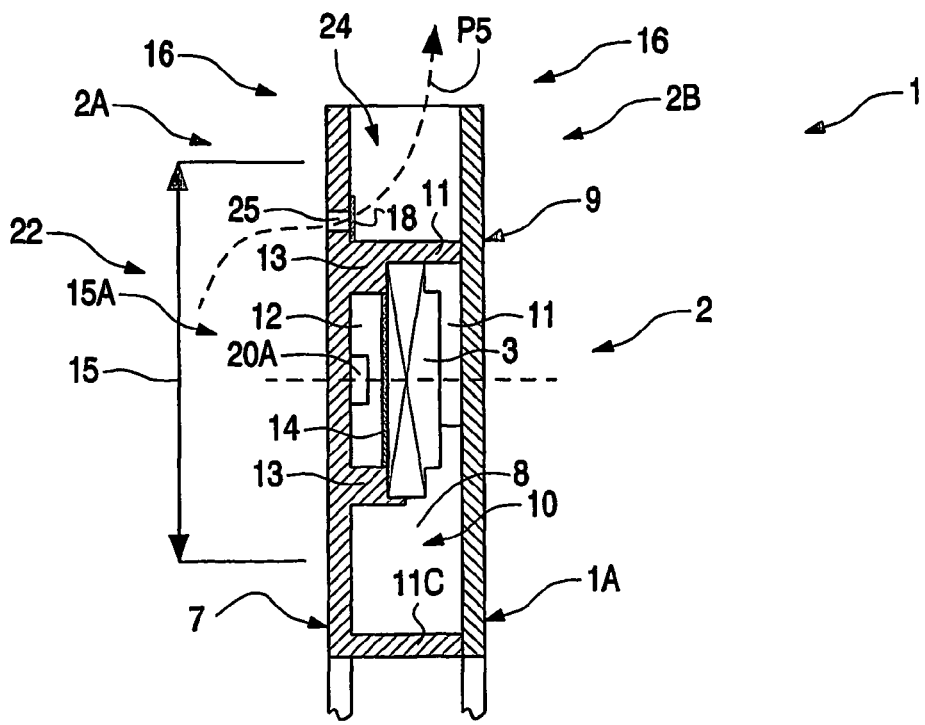
Figure 4:
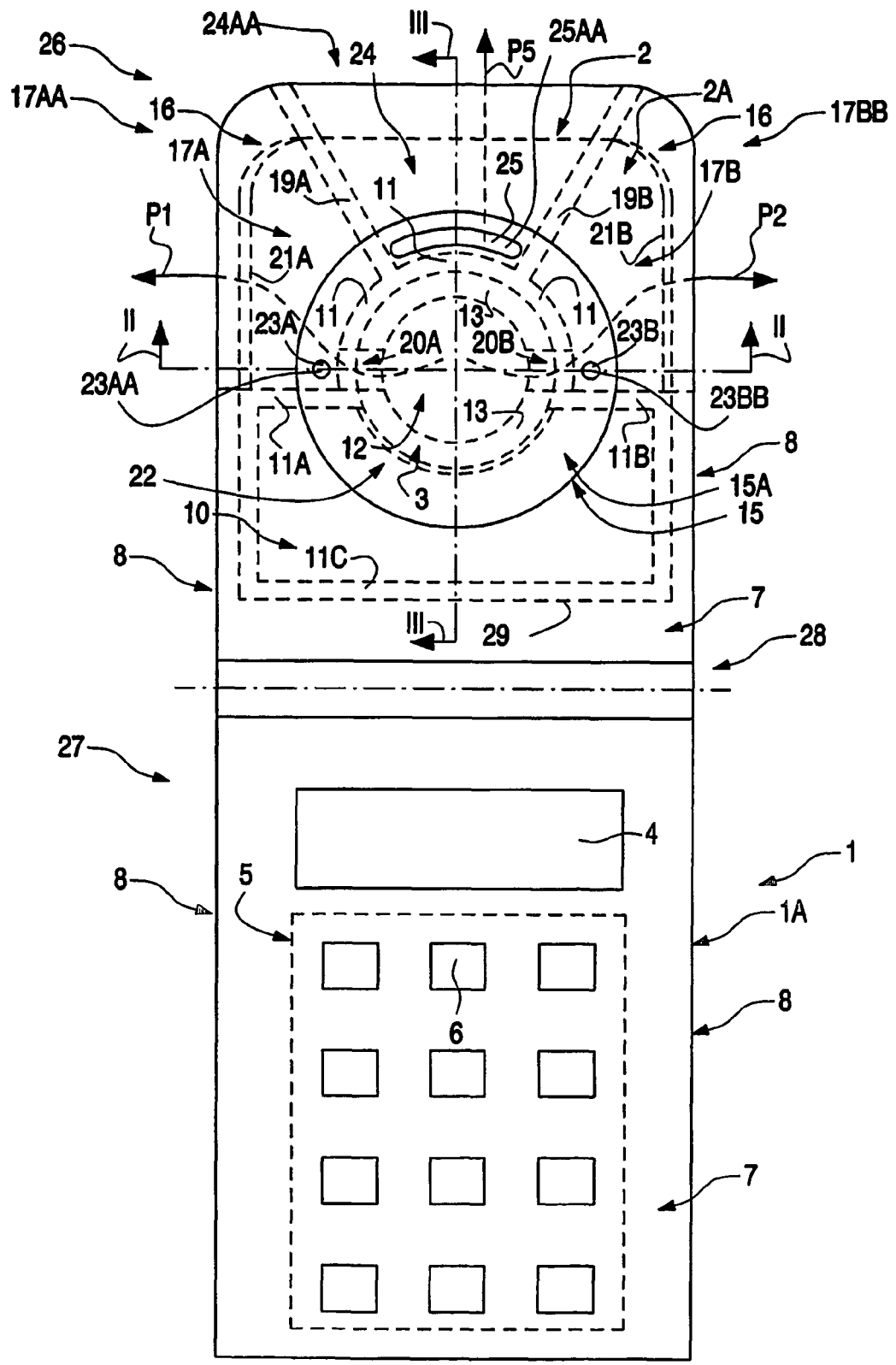

In the drawings:

FIG. 1 shows diagrammatically and in plan view a communication device in accordance with a first exemplary embodiment of the invention, FIG. 2 shows the communication device in accordance with FIG. 1 in a section along the line II-II in FIG. 1, FIG. 3 shows the communication device in accordance with FIG. 1 in a section along the line III-III in FIG. 1, FIG. 4 shows, analogously to FIG. 1, a communication device in accordance with a second exemplary embodiment of the invention comprising a module.

FIG. 1 shows a communication device that is implemented as a mobile telephone 1. The mobile telephone 1 comprises a housing 1A that forms holding means 2 that are designed to hold components accommodated in the mobile telephone 1. Of said components, FIG. 1 shows a loudspeaker 3 having a diameter of 16 mm, a display 4 and a keypad 5 that comprises a multiplicity of keys 6. FIG. 1 does not show a further component, namely an electrical circuit, that is likewise held by the holding means 2.

The holding means 2 comprise a first holding-means part 2A that is essentially designed in dish shape and implements a front boundary wall 7 and a lateral boundary wall 8 of the mobile telephone 1. The holding means 2 furthermore comprise a second holding-means part 2B that is of plate-shaped design and that forms a rear boundary wall 9 of the mobile telephone 1. The rear boundary wall 9 terminates in wide regions along the outer periphery of the mobile telephone 1 flushly with the lateral boundary wall 8, in particular in the region of the display and the keypad up to the region of the loudspeaker 3.

The mobile telephone 1 furthermore comprises, in the region of the loudspeaker 3, a rear chamber 10 that extends in the direction of the display 4 and is at least partly provided directly behind the loudspeaker 3 and that seals an air volume situated behind the loudspeaker 3. The rear chamber 10 is implemented with the aid of a part of the front boundary wall 7 and a part of the rear boundary wall 9 and a part of the lateral boundary wall 8 and with the aid of four rear-chamber boundary walls 11, 11A, 11B and 11C that are implemented with the aid of the first holding-means 2A. The first holding-means part 2A and the second holding-means part 2B are joined to one another in such a way that the rear chamber 10 is essentially acoustically tightly sealed.

The mobile telephone 1 has a front chamber 12 that is disposed in front of the loudspeaker 3 and that is implemented with the aid of the front boundary wall 7 and with the aid of a front-chamber boundary wall 13 that is assigned to the first holding-means part 2A and forms a circular support base to which the loudspeaker 3 is bonded along its outer periphery. The front chamber 12 is sealed on the loudspeaker side by a loudspeaker cover 14 that comprises an acoustic friction with whose aid the loudspeaker fundamental resonance is attenuated and that protects the relatively thin loudspeaker membrane against direct exposure to contamination.

The communication device 1 is designed to deliver the sound generated by the loudspeaker 3 in an against-the-ear mode, that is to say if a user's ear is brought up against a standard measuring ear region 15 indicated diagrammatically in FIGS. 1 to 3. The communication device 1 is furthermore designed to deliver the sound generated by the loudspeaker 3 in an away-from-the-ear mode, that is to say in a hands-free mode, into an acoustic free space surrounding the mobile telephone 1. For the purpose of delivering sound in the away-from-the-ear mode, the holding means 2 comprise a first holding-means region 16 via which, in the against-the-ear mode, the sound generated by the loudspeaker 3 can be delivered without hindrance through the ear. In the present case, the first holding-means region 16 is provided in the left-hand or in the right-hand upper part of the lateral boundary wall 8 of the housing 1A.

The communication device 1 comprises, in its interior, a sound-collecting chamber that can be directly exposed to sound with the aid of the loudspeaker 3, from which sound-collecting chamber the sound generated can be delivered by the mobile telephone 1. In the present case, the sound-collecting chamber is implemented by the front chamber 12. It should be mentioned, however, that the sound-collecting chamber may also be implemented by the rear chamber 10 if, for example, the front chamber is acoustically tightly sealed.

To implement the away-from-the-ear mode, the mobile telephone 1 has first sound-conveying means that are implemented with the aid of the holding means 2 and with whose aid the sound generated by the loudspeaker 3 can be conveyed in the away-from-the-ear mode through the first holding-means region 16 into the acoustic free space. The first sound-conveying means comprise at least a first sound-delivery chamber 17A designed to be open towards the first holding-means region 16 and a second sound-delivery chamber 17B, which sound-delivery chambers 17A and 17B are bounded with the aid of parts of the rear boundary wall 9, the front boundary wall 7, the rear chamber boundary wall 11 and by a first chamber partition 19A and the rear-chamber boundary wall 11A or by a second chamber partition 19B and the rear-chamber boundary wall 11B. The first sound-conveying means furthermore comprise a first coupling duct 20A, which coupling duct 20A opens at its one end into the sound-collecting chamber and at its other end into the sound-delivery chamber 17A and which coupling duct 20A is completely implemented with the aid of the first holding-means part 2A. The second sound-conveying means furthermore comprises a second coupling duct 20B, which coupling duct 20B opens at its one end into the sound-collecting chamber and at its other end into the sound-delivery chamber 17B and which coupling duct 20B is completely implemented with the aid of the first holding-means part 2B.

Accordingly, the coupling duct 20 passes through the front-chamber boundary wall 13 and extends essentially parallel to the rear-chamber boundary walls 11A and 11B, which extend from the respective lateral boundary wall 8 to the loudspeaker 3. The coupling ducts 20A and 20B have an essentially rectangular flow cross section, which flow cross section has a width of 6 mm and a height of 0.5 mm. The sound-delivery channel 17 has a volume of 0.3 ccm. Furthermore, each of the sound-delivery chambers 17A and 17B has, in the region in which they are designed as open to the first holding-means region 16, a cover 21A or 21B, respectively, that has an acoustic friction and forms a protection against contamination. Consequently, the sound can be delivered in the away-from-the-ear mode along the arrows P1 and P2.

The holding means 2 furthermore comprise a second holding-means region 15A that corresponds to the standard measuring-ear region 15 and that does not also comprise the first holding-means region 16 and via which the sound generated in the against-the-ear mode with the loudspeaker 3 can be fed to the space 22 bounded by the ear. Accordingly, the second holding-means region 15A does not comprise any housing region that is accessible from outside the housing 1A and from which sound can escape in the away-from-the-ear mode into the acoustic free space without hindrance by the ear. Such housing regions are formed in the present case by that opening of the first sound-delivery chamber 17A and the second sound-delivery chamber 17B that opens into the acoustic free space. In the present case, the first holding-means region 16 is separated from the second holding-means region 15A by a circle at the front boundary wall 7, which circle indicates the outer limit of the standard measuring-ear region 15.

For the purpose of sound delivery into the ear, second sound-conveyance means with whose aid the sound generated by the loudspeaker 3 can be conveyed in the against-the-ear mode through the second holding-means region 15A into the space 22 bounded by the ear are realized with the aid of the holding means 2. The second sound-conveying means are formed by a wall of the sound-delivery chamber 17 with the aid of a first passage 23A and a second passage 23B, which wall of the sound-delivery chamber 17 is formed by a part of the front boundary wall 7 of the first holding-means part 2A. The passages 23A and 23B have a flow cross section with a cross-sectional area of 3 mm$^2$ and are each covered along the inside of the sound-delivery chamber 17 by means of a cover 24A and 24B that has an acoustic friction. Consequently, the sound in the against-the-ear mode can be delivered along the arrows P3 and P4. It should be mentioned at this point that the first holding means region 16 can also be provided at any other desired point of the mobile telephone 1 or of its housing 1A by omitting the second holding-means region 15A.

The mobile telephone 1 furthermore comprises sound-conveying means that are disposed at least partly inside the second holding-means region 15A, that is to say inside the standard measuring ear region 15, and that are designed to remove the sound that can be delivered through the second holding-means region 15 into the space 22 bounded by the ear from said space 22 into the acoustic free space. For this purpose, the sound-deflection means comprise a sound-deflection chamber 24 that is open at least to the first holding-means region 16. The sound-deflection chamber 24 is bounded by a part of the rear boundary wall 9, of the front boundary wall 7 and the chamber partitions 19A and 19B and that part of the rear-chamber boundary wall 11 extending between the chamber partitions 19A and 19B.

The sound-deflection means furthermore have a deflection duct 25 that opens at its one end into the sound-deflection chamber 24 and at its other end into the space 22 bounded by the ear. For this purpose, the deflection duct 25 passes through the front boundary wall 7 inside the second holding-means region, that is to say inside the standard measuring-ear region 15, along that part of the rear-chamber boundary wall 11 that extends between the chamber partitions 19A and 19B. The deflection duct 25 is furthermore provided in the region of the opening into the sound-deflection chamber 24 with a cover 18 that covers the cross section of the deflection duct 25 and that has an acoustic friction. Consequently, the ventilation takes place along the arrow P5.

Consequently, provision is made in a mobile telephone 1 according to the invention that the sound is generated by a single loudspeaker 3, and is simultaneously delivered via the first sound-conveying means and the second sound-conveying means of the mobile telephone 1 since the two sound-conveying means are simultaneously available or active both in the against-the-ear mode and in the away-from-the-ear mode. In the present case, the sound is delivered in an indirect way, namely through covers, in which connection it should, however, be mentioned that said covers can be omitted so that the sound can also be delivered in a direct way. Equally, covers can also be provided that implement no acoustic friction. The provision of said measures advantageously achieves the result that no additional electronic or mechanical protection measures have to be provided that, in the event of an inadvertent incorrect use in the away-from-the-ear mode, that is to say if the mobile telephone 1 is inadvertently brought into the vicinity of an ear in this mode help, to prevent an injurious overloading of a human auditory organ because such an overloading can virtually not occur as a result of the provision of the measures according to the invention. Furthermore, the result is achieved that, in the against-the-ear mode, the space 22 bounded by the ear is directly ventilated and, to be precise, directly into the acoustic free space. It has proved particularly advantageous in this connection that no chamber or duct exposed to sound by the loudspeaker 3 is used for the ventilation. It has furthermore proved particularly advantageous that the sound is delivered by the loudspeaker 3 from a single side—in the present case from the front side—with the result that the volume of the rear chamber 10 is used exclusively to avoid an acoustic short circuit between the front side of the loudspeaker 3 and the rear side of the loudspeaker 3.

It should be mentioned at this point that, instead of the two sound-delivery chambers 17A and 17B, only a single sound-delivery chamber may also be provided or that more than two, for example three, four, five or ten such sound-delivery chambers may be provided. It should furthermore be mentioned that the deflection duct 25 and the two passages 23A and 23B can also have a shape other than that shown in FIG. 1. For example, the passages 23A and 23B may comprise two regions having different diameters, it being beneficial to provide the narrower passage region of the two regions in the direction of the loudspeaker 3 and to provide the wider passage region in the direction of the space 22 bounded by the ear.

It should furthermore be mentioned that the relative positions between the deflection duct 25 and one of the passages 23A or 23B can in each case be varied as desired provided there is a spacing between the deflection duct 25 and the respective passage 23A or 23B inside the diameter of the standard measuring-ear region 15 that is given by 25.4 mm. The shape of the second holding-means region 15A can therefore also deviate from the circular shape shown in FIG. 1 and the second holding-means region 15A does not have to be disposed directly opposite the loudspeaker 3 either. It should furthermore be mentioned that a separate duct may also be provided for each passage.

It should furthermore be mentioned at this point that there is in general the requirement that the sound delivery from the rear of the loudspeaker 3, that is to say from the rear chamber 10, should be substantially less than from the front side of the loudspeaker 3, that is to say from the sound-collecting chamber, in order to keep acoustic cancellations between the front side and the rear side of the loudspeaker 3 as small as possible. Said requirement is optimally fulfilled if the rear chamber 10 is acoustically tightly sealed. It is, however, also possible that a deliberate leak is provided, such as, for example, a bass reflex opening. A slight leak is also acceptable if the implementation of an absolutely sealed rear chamber 10 with the aid of the holding means 2 formed by the housing 1A is too expensive.

The mobile 1 telephone shown in FIG. 4 comprises a housing 1A that is of two-part design and that comprises a first mobile-telephone part 26 and a second mobile-telephone part 27, the mobile-telephone parts 26 and 27 being joined to one another by a swiveling device 28 and being capable of being swiveled towards one another around a swivel axis of the swiveling device 28, with the result that as compact a construction as possible is implemented. The mobile telephone 1 has a module 29 that is provided in the first mobile telephone 26 inside the housing 1A. The module 29 comprises the loudspeaker 3 and the holding-means 2 for the loudspeaker 3. The module 29 furthermore comprises the first sound-conveying means and the second sound-conveying means. The design of the module 29 essentially corresponds to the head part of the mobile telephone 1 shown in FIG. 1 so that the cross sections through the module 29 along the section lines II-II and III-III shown in FIG. 4 essentially correspond to the cross sections shown in FIGS. 2 and 3 of the mobile telephone in accordance with FIG. 1.

In order to be able to deliver, without disturbance, the sound conveyed by the first sound-conveying means and the second sound-conveying means from the mobile telephone 1, the housing 1A comprises housing channels or housing openings 23AA, 23BB, 17AA, 17BB, 24AA and 25AA that correspond to the sound-delivery chamber 17A and 17B and the sound-deflection chamber 24 and the deflection duct 25 or to the passages 23A and 23B. It should, however, be mentioned that housing channels can be omitted if the outer periphery of the module 29 is essentially congruent with the outer periphery of the mobile telephone 1, with the result that only housing openings 23AA, 23BB, 17AA, 17BB, 24AA and 25AA are needed.

It should be mentioned that the module 29 may also comprise other components of the mobile telephone 1, such as, for example, the display 4 or the keypad 5 so that functions in addition to the acoustic functions implemented with the aid of the loudspeaker 3 can be provided, which achieves the advantage that, in the assembly of the mobile telephone 1, a plurality of assemblies do not have to be inserted into the housing, but only the module 29 itself.

It should be mentioned that the loudspeaker 3 may have so-called spring contacts with whose aid electrical signals can be fed to the loudspeaker 3. It should furthermore mentioned in this connection that, inside the module 29, an electrical circuit implemented on a printed circuit board may also be provided inside the rear chamber 10, which electrical circuit is designed to deliver the electrical signals to the loudspeaker 3 and which electrical circuit comprises contacts corresponding to the spring contacts of the loudspeaker 3 so that, when the first holding-means part 2A is brought together with the second holding-means part 2B, the spring contacts of the loudspeaker 3 are connected to those contacts of the electrical circuit that correspond thereto and, to be specific, in particular without further alignment or manual joining operations. The same applies to the case where, for example, a display 4 is provided in the module 29, which display 4 is joined to the first holding-means part 2A and which display 4 is connected, analogously to the loudspeaker 3, to an electrical circuit joined to the second holding-means part 2B for controlling the display 4.

It should furthermore be mentioned that the flow cross section of the coupling duct 20 depends on the length of the coupling duct 20, the length of the coupling duct 20 in the present case being given by the thickness of the front-chamber boundary wall 13. Depending on the thickness of the front-chamber boundary wall 13, whose thickness can be varied within a range satisfying certain mechanical requirements, various dimensions of the flow cross section are possible that—in the present case with a rectangular cross-sectional shape—lies expediently in a range from 5 mm to 8 mm for the width of the flow cross section and in a range from 0.3 mm to 0.7 mm for the height of the flow cross section. It should furthermore be mentioned that the height of the flow cross section is limited by the height of the front chamber 12. Generally, it may be stated in this connection that, if the length of the coupling duct 20 is altered by the factor x, the flow cross section of the coupling duct also alters by the factor x and, to be specific, in such a way that, if the length is increased, the flow cross section is also increased or if the length is reduced, the flow cross section is also reduced. It should furthermore be mentioned that the flow cross section may also have a shape of an ellipse or a circle.

In regard to the sound-delivery chamber 17, it should furthermore be mentioned that the volume of said sound-delivery chamber 17 should be kept as small as possible in order to ensure a small overall height for the module 29 or the mobile telephone 1, it being borne in mind that the coupling duct 20 and the sound-delivery chamber 17 form a resonator with whose aid the sound level can be deliberately amplified in a certain frequency range in order, for example, to be able to deliver, in the hands-free mode, a voice signal or a sound signal, such as, for example, a so-called BUZZ signal, having the required bandwidth up to frequencies of 10 kHz or even 16 kHz.

It should furthermore be mentioned that both an electromagnetic or an electrodynamic loudspeaker may be used as a loudspeaker. A piezoelectric loudspeaker is also possible.

It should be mentioned that the communication device can also be formed by a portable radio telephone, namely a so-called "walkie-talkie".

Furthermore, provision may be made that such a module may also form a component of a so-called "personal digital assistant" that implements the communication device.

It should furthermore be mentioned that the sound-conveying means may be designed as continuously tapering or expanding or even funnel-shaped with a linear or corrugated interior.

The invention claimed is:

1. A hand-held communication device comprising:
    a loudspeaker to generate and deliver sound, in an against-the-ear mode, into a space bounded by an ear and, in an away-from-the-ear mode, into an acoustic free space a hand-held housing that includes
        a sound-collecting chamber that encloses at least a portion of the loudspeaker,
        a first housing region to convey, in the against-the-ear mode, the sound generated by the loudspeaker into the acoustic free space without being blocked by the ear,
        a second housing region, that does not comprise the first housing region, to convey the sound generated by the loudspeaker in the against-the-ear mode to the space bounded by the ear,
        a sound-delivery chamber to convey the sound generated by the loudspeaker, in the away-from-the-ear mode, through the first housing region into the acoustic free space, the sound-delivery chamber to amplify the sound conveyed into the acoustic free space relative to the sound conveyed into the space bounded by the ear, and relative to the sound entering the sound-delivery chamber,
        a first duct to convey the sound generated by the loudspeaker, in the against-the-ear mode, from the sound-delivery chamber and through the second housing region into the space bounded by the ear, and
        a second duct to convey the sound generated by the loudspeaker from the sound-collecting chamber to the sound-delivery chamber, in both the against-the-ear mode and the away-from-the-ear mode.

2. A communication device as claimed in claim 1, wherein the second duct opens at one end into the sound-collecting chamber and at another end into the sound-delivery chamber, and the sound-delivery chamber to amplify the sound conveyed by the second duct from the loudspeaker and to convey the amplified sound through the first housing region into the acoustic free space.

3. A communication device as claimed in claim 1, wherein the second duct has an essentially rectangular flow cross-section having a width in a range from 5 mm to 8 mm and a height in a range from 0.3 mm to 0.7 mm.

4. A communication device as claimed in claim 3, wherein the sound-delivery chamber has a volume in a range from 0.01 ccm to 0.4 ccm.

5. A communication device as claimed in claim 1, wherein the sound-delivery chamber has a portion that opens to the first housing region, the communications device further including a cover having an acoustic friction to cover the portion of the sound-delivery chamber that opens to the first housing region, and wherein the portion of the sound-delivery chamber has a cross section that is larger than a cross-section of the second duct.

6. A communication device as claimed in claim 1, wherein the first duct is defined by a boundary wall of the sound-delivery chamber, the sound-delivery chamber to amplify the sound conveyed through the first housing region into the acoustic free space to a greater extent than the sound conveyed by the second duct through the second housing region into the space bounded by the ear, wherein the second duct and the sound-delivery chamber create a resonator, the sound-delivery chamber amplifying a sound level of the sound conveyed to the acoustic free space through resonance.

7. A communication device as claimed in claim 6, wherein the first duct has a flow cross-section having a cross-sectional area in the range between 1 mm$^2$ and 5 mm$^2$.

8. A communication device as claimed in claim 6, wherein the first duct is covered along the inside of the sound-delivery chamber with a cover that has an acoustic friction.

9. A communication device as claimed in claim 1, further comprising a sound deflector disposed at least partly inside the second housing region to deflect the sound delivered through the second housing region into the space bounded by an ear, from said space into the acoustic free space.

10. A communication device as claimed in claim 9, wherein the sound deflector includes a sound-deflection chamber that is open at least to the first housing region, and a deflection duct that opens at one end into the sound-deflection chamber and at another end into the space bounded by the ear.

11. A communication device as claimed in claim 10, further comprising a cover that covers the cross section of the deflection duct and that has an acoustic friction, and that is provided in the region of the opening of the deflection duct into the sound-deflection chamber.

12. A communication device as claimed in claim 1, further including an acoustically-sealed rear chamber that is on an opposite side of the loudspeaker, relative to the sound-collecting chamber, and that seals an air volume situated on the opposite side of the loudspeaker.

13. A communication device as claimed in claim 12, wherein the loudspeaker separates the sound-collecting chamber from the rear chamber.

14. A communication device as claimed in claim 1, wherein the second duct and the sound-delivery chamber form a resonator that amplifies the sound generated by the loudspeaker in a frequency range of between about 4 kHz and 10 kHz.

15. A communication device as in claim 1, wherein the second duct and the sound-delivery chamber are arranged to reduce the sound pressure in the sound-delivery chamber, relative to sound pressure in the sound-collecting chamber.

16. A communication device as in claim 1, wherein the hand-held housing further includes another sound-delivery chamber to convey the sound generated by the loudspeaker, in the away-from-the-ear mode, through the first housing region into the acoustic free space, and a third duct to convey the sound generated by the loudspeaker from the sound-collecting chamber to the other sound-delivery chamber, in both the against-the-ear mode and the away-from-the-ear mode.

17. A communication device as in claim 16, wherein the hand-held housing further includes a fourth duct to convey the sound generated by the loudspeaker, in the against-the-ear mode, from the other sound-delivery chamber and through the second housing region into the space bounded by the ear.

18. A communication device as in claim 16, wherein, in the away-from-the-ear mode, the sound-delivery chamber is further to amplify the sound conveyed by the second duct from the loudspeaker and to convey the amplified sound through the first housing region into the acoustic free space, and wherein, in the away-from-the-ear mode, the other sound delivery chamber is further to amplify the sound conveyed by the third duct from the loudspeaker and to convey the amplified sound through the first housing region into the acoustic free space.

19. A communication device as in claim 17, wherein, in the away-from-the-ear mode, the sound-delivery chamber and the other sound-delivery chamber are further to amplify the sound conveyed through the first housing region into the acoustic free space to a greater extent than the sound conveyed by the second and fourth ducts through the second housing region into the space bounded by the ear.

20. A communication device as in claim 16, further comprising a sound deflector disposed at least partly inside the second housing region to deflect the sound delivered through the second housing region into the space bounded by an ear, from said space into the acoustic free space, the sound deflector including a sound-deflection chamber that is open at least to the first housing region, and a deflection duct that opens at one end into the sound-deflection chamber and at another end into the space bounded by the ear.

* * * * *